(12) United States Patent
Mano et al.

(10) Patent No.: US 12,398,257 B2
(45) Date of Patent: Aug. 26, 2025

(54) ANTI-CORROSIVE MATERIAL, WIRE WITH TERMINAL, AND WIRE HARNESS

(71) Applicant: Yazaki Corporation, Tokyo (JP)

(72) Inventors: Kazuki Mano, Shizuoka (JP); Kenji Osada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 499 days.

(21) Appl. No.: 17/511,661

(22) Filed: Oct. 27, 2021

(65) Prior Publication Data

US 2022/0127431 A1    Apr. 28, 2022

(30) Foreign Application Priority Data

Oct. 28, 2020 (JP) .................. 2020-180506

(51) Int. Cl.
| | | |
|---|---|---|
| *H01B 7/00* | (2006.01) | |
| *C08F 2/48* | (2006.01) | |
| *C08F 220/18* | (2006.01) | |
| *C08F 222/10* | (2006.01) | |
| *C08K 5/3475* | (2006.01) | |
| *C08K 5/3492* | (2006.01) | |
| *H01B 7/28* | (2006.01) | |
| *H01R 4/62* | (2006.01) | |

(52) U.S. Cl.
CPC .............. *C08K 5/3475* (2013.01); *C08F 2/48* (2013.01); *C08F 220/1811* (2020.02); *C08F 222/102* (2020.02); *C08F 222/1065* (2020.02); *C08K 5/34924* (2013.01); *H01B 7/0045* (2013.01); *H01B 7/2806* (2013.01); *H01R 4/62* (2013.01)

(58) Field of Classification Search
None
See application file for complete search history.

(56) References Cited

U.S. PATENT DOCUMENTS

| | | | | |
|---|---|---|---|---|
| 4,329,381 | A * | 5/1982 | Eschwey | .............. C07D 277/72 |
| | | | | 427/388.1 |
| 2012/0112456 | A1 | 5/2012 | Nagareo et al. | |
| 2012/0199391 | A1 | 8/2012 | Inoue et al. | |
| 2016/0308301 | A1 | 10/2016 | Mano | |
| 2016/0326410 | A1 | 11/2016 | Yamaguchi et al. | |
| 2017/0130062 | A1* | 5/2017 | Oota | .......................... C09D 7/48 |

FOREIGN PATENT DOCUMENTS

| | | |
|---|---|---|
| CN | 102459376 A | 5/2012 |
| CN | 106065208 A | 11/2016 |
| JP | 2011-103266 A | 5/2011 |
| JP | 2015-181322 A | 10/2015 |

OTHER PUBLICATIONS

Zeng Yiwen, "Application of uric acid in fine chemical products", Finalize J, 1987, vol. 4, pp. 42-47 (12 pages total).

* cited by examiner

*Primary Examiner* — Tanisha Diggs
(74) *Attorney, Agent, or Firm* — Sughrue Mion, PLLC

(57) ABSTRACT

An anti-corrosive material includes an ultraviolet curable resin including, as a main component, a polymerizable compound including at least one of a photopolymerizable (meth)acrylate monomer or a photopolymerizable (meth) acrylate oligomer, and an anti-rust agent. The polymerizable compound includes a combination of a monofunctional (meth)acrylate monomer and a bifunctional (meth)acrylate monomer, or a combination of at least one of a monofunctional (meth)acrylate monomer or a bifunctional (meth) acrylate monomer and at least one of a trifunctional (meth) acrylate monomer or a polyfunctional (meth)acrylate monomer having four or more functional groups. The anti-corrosive material has a viscosity of 18,900 mPa·s or less.

4 Claims, 2 Drawing Sheets

ANTI-CORROSIVE MATERIAL, WIRE WITH TERMINAL, AND WIRE HARNESS

CROSS REFERENCE TO RELATED APPLICATION

The present application is based on, and claims priority from the prior Japanese Patent Application No. 2020-180506, filed on Oct. 28, 2020, the entire contents of which are incorporated herein by reference.

TECHNICAL FIELD

The present disclosure relates to an anti-corrosive material, a wire with a terminal, and a wire harness.

BACKGROUND

In recent years, use of aluminum in a coated wire constituting a wire harnesses has been increasing to reduce a weight of a vehicle and thus increase the fuel efficiency of the vehicle. Further, a metal terminal to be connected to such a coated wire is usually formed of copper or a copper alloy having excellent electrical properties. However, when different materials are used for a conductor of the coated wire and the metal terminal, corrosion of a joint between the conductor and the metal terminal is easily caused. Thus, an anti-corrosive material is required to prevent corrosion of the joint.

Japanese Unexamined Patent Application Publication No. 2011-103266 discloses a coated wire with a terminal formed of an anti-corrosive material containing a thermoplastic polyamide resin as a main component, and having a tensile shear strength of 6 N/mm$^2$ or greater for a bundle of aluminum, an elongation rate of 100% or greater, and a moisture absorbing rate of 1.0% or less. An anti-corrosive effect is exerted by applying the anti-corrosive material to surround the joint between the conductor of the coated wire and the metal terminal and cover the joint.

SUMMARY

The metal terminal connected to the coated wire is subjected to tin plating, for example. Further, the tin-plated part is corroded, the anti-corrosive material tends to peel off together with the tin-plated part from the metal terminal. When such peeling occurs, water penetrates, which causes corrosion. Thus, even when the anti-corrosive material prevents penetration of water, a penetration pathway for water is formed once peeling occurs between the anti-corrosive material and the metal plated-part or the like, which degrades an anti-corrosive effect.

The present disclosure has been achieved in view of the above-mentioned problem in such a related-art. Further, the present disclosure has an object to provide an anti-corrosive material capable of preventing peeling at a boundary surface with respect to a metal member and exerting an anti-corrosive effect for a long time period, a wire with a terminal, and a wire harness using the same.

An anti-corrosive material according to an embodiment includes an ultraviolet curable resin including, as a main component, a polymerizable compound including at least one of a photopolymerizable (meth)acrylate monomer or a photopolymerizable (meth)acrylate oligomer, and an anti-rust agent. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. 0.05 to 5 parts by mass of the anti-rust agent are contained for 100 parts by mass of the ultraviolet curable resin. The anti-corrosive material has a viscosity of 18,900 mPa·s or less, the viscosity being measured at 25° C. according to JIS Z8803.

According to the configuration described above, there can be provided the anti-corrosive material capable of preventing peeling at the boundary surface with respect to the metal member and exerting an anti-corrosive effect for a long time period, the wire with a terminal, and the wire harness using the same.

DETAILED DESCRIPTION

Figure 1:
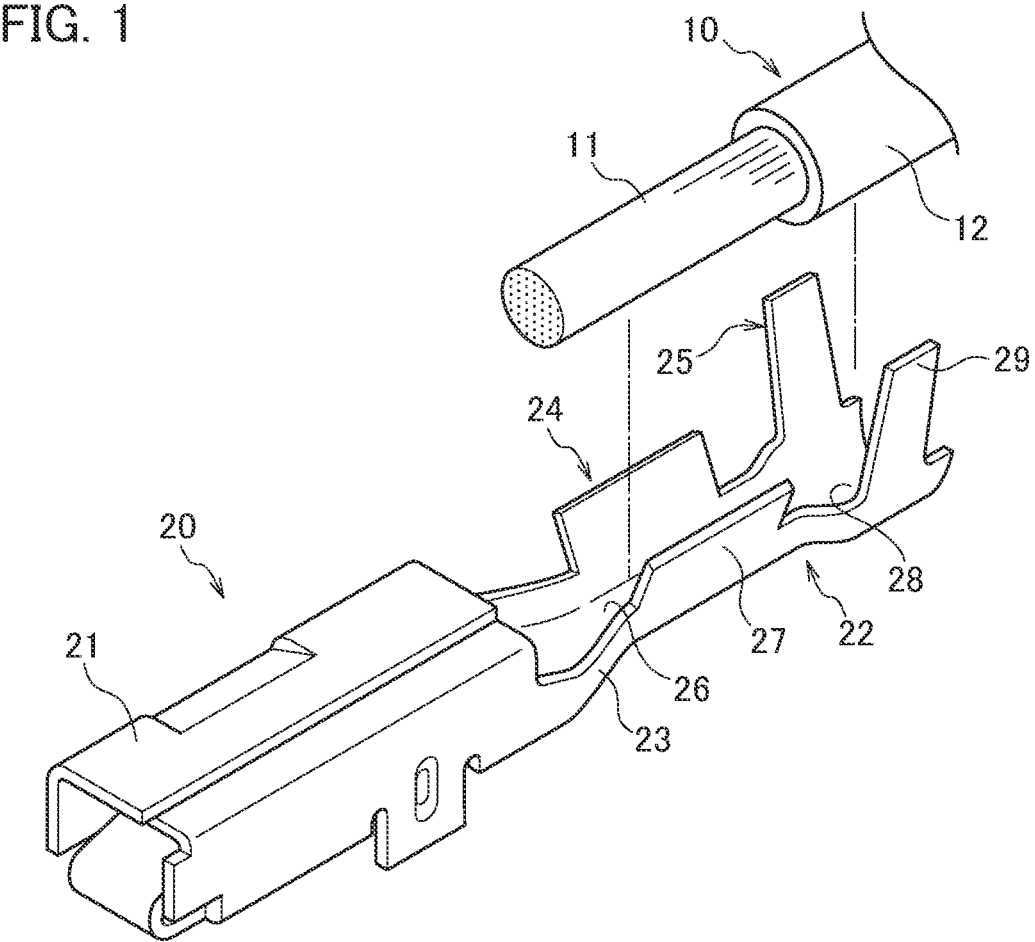
FIG. 1 is a schematic view of a wire with a terminal according to the present embodiment for illustrating a state before the wire is connected to a metal terminal.

Various embodiments will be described hereinafter with reference to the accompanying drawings.

[Anti-Corrosive Material]

The anti-corrosive material according to the present embodiment covers a joint constituted of different metal parts to prevent entrance of corroding substances, and thus prevents corrosion of the joint for a long time period. Further, the anti-corrosive material according to the present embodiment contains an ultraviolet curable resin and an anti-rust agent.

A resin containing, as a main component, a polymerizable compound including at least one of a photopolymerizable (meth)acrylate monomer or a photopolymerizable (meth)acrylate oligomer is used as the ultraviolet curable resin. However, a resin containing, as a main component, a polymerizable compound including a photopolymerizable (meth)acrylate monomer is preferably used. Further, a resin containing, as a main component, a polymerizable compound including both a photopolymerizable (meth)acrylate monomer and a photopolymerizable (meth)acrylate oligomer is further preferably used as the ultraviolet curable resin. When the acrylate-based polymerizable compound described above is used as the ultraviolet curable resin, a sealing member obtained by curing the resin has a high adhesive force, and has excellent weather resistance and impact resistance. Thus, corrosion of the joint can be prevented.

Here, the photopolymerizable (meth)acrylate monomer and the photopolymerizable (meth)acrylate oligomer each have a functional group having a carbon-carbon unsaturated bond. Further, the photopolymerizable (meth)acrylate monomer is categorized into a monofunctional (meth)acrylate monomer having one functional group, a bifunctional (meth)acrylate monomer having two functional groups, a trifunctional (meth)acrylate monomer having three functional groups, and polyfunctional (meth)acrylate monomer having four or more functional groups. Further, the photopolymerizable (meth)acrylate oligomer is categorized into a monofunctional (meth)acrylate oligomer having one functional group, a bifunctional (meth)acrylate oligomer having two functional groups, a trifunctional (meth)acrylate oligomer having three functional groups, and polyfunctional (meth)acrylate oligomer having four or more functional groups.

As the monomer contained in the ultraviolet curable resin, at least one of a trifunctional (meth)acrylate monomer or a polyfunctional (meth)acrylate monomer is used instead of a monofunctional (meth)acrylate monomer and a bifunctional (meth)acrylate monomer. In this case, a cross linking density of a cured object tends to increase after curing the resin. For this reason, such a cured object obtained by curing the ultraviolet curable resin has improved strength and hardness, and also has high surface curability (tackiness). However, due to the trade-off, the cured object has reduced elongation and depth curability, and the cured object to be obtained disadvantageously peels off. Thus, it is difficult to prevent corrosion for a long time period.

For this reason, in the polymerizable compound of the ultraviolet curable resin of the present embodiment, a monofunctional (meth)acrylate monomer and a bifunctional (meth)acrylate monomer are used in combination. Alternatively, in the polymerizable compound, at least one of a monofunctional (meth)acrylate monomer or a bifunctional (meth)acrylate monomer and at least one of a trifunctional (meth)acrylate monomer or a polyfunctional (meth)acrylate monomer having four or more functional groups are used in combination. When a (meth)acrylate compound having a small number of functional groups and a (meth)acrylate compound having a large number of functional groups are mixed instead of using only a polyfunctional (meth)acrylate monomer having three or more functional groups, the cross linking density of the cured object to be obtained can be prevented from increasing excessively. For this reason, the cured object to be obtained can have improved elongation and depth curability in addition to strength, hardness, and surface curability. As a result, the cured object to be obtained can be prevented from peeling off at the joint formed of different materials, and can prevent corrosion of the joint for a long time period. Note that depth curability is an index indicating a depth at which the resin is cured when being irradiated with light from above. Further, throughout the specification, the term "(meth)acrylate" includes both acrylate and methacrylate.

Usable monofunctional acrylate monomers are compounds represented by Chemical Formula 1. Specific examples thereof include ethoxylated o-phenylphenol acrylate (see Chemical Formula (a), viscosity: 150 mPa·s at a temperature of 25° C.), methoxypolyethylene glycol 400 acrylate (see Chemical Formula (b), where n=9, viscosity: 28 mPa·s at a temperature of 25° C.), methoxypolyethylene glycol 550 acrylate (see Chemical Formula (b), where n=13), phenoxypolyethylene glycol acrylate (see Chemical Formula (c), viscosity: 16 mPa·s at a temperature of 25° C.), 2-acryloyloxyethyl succinate (see Chemical Formula (d), viscosity: 180 mPa·s at a temperature of 25° C.), and isostearyl acrylate (see Chemical Formula (e), viscosity: 18 mPa·s at a temperature of 25° C.) produced by Shin Nakamura Chemical Co., Ltd. Further, other examples of the monofunctional acrylate monomer include β-carboxyethyl acrylate (viscosity: 75 mPa·s at a temperature of 25° C.), isobornyl acrylate (viscosity: 9.5 mPa·s at a temperature of 25° C.), octyl/decyl acrylate (viscosity: 3 mPa·s at a temperature of 25° C.), ethoxylated phenyl acrylate (EO: 2 mol) (viscosity: 20 mPa·s at a temperature of 25° C.), and ethoxylated phenyl acrylate (EO: 1 mol) (viscosity: 10 mPa·s at a temperature of 25° C.) produced by DAICEL-ALLNEX LTD.

[Chem. 1]

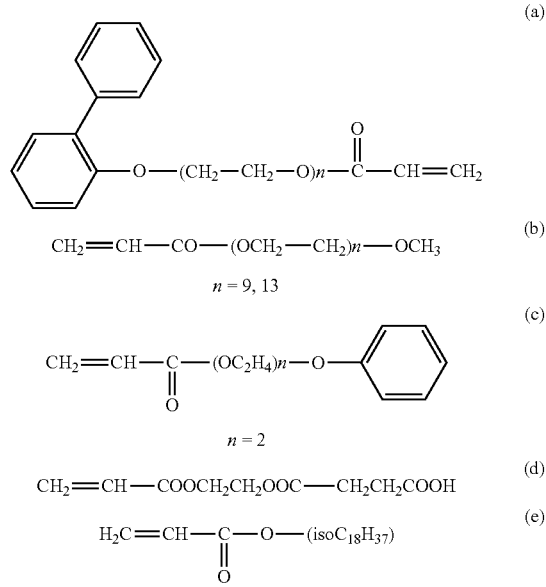

Usable bifunctional acrylate monomers are compounds represented by Chemical Formula 2-1 to Chemical Formula 2-3. Specific example thereof include 2-hydroxy-3-(acryloyloxy)propyl methacrylate (see Chemical Formula (a), viscosity: 44 mPa·s at a temperature of 25° C.), polyethylene glycol 200 diacrylate (see Chemical Formula (b), n=4, viscosity: 22 mPa·s at a temperature of 25° C.), polyethylene glycol 400 diacrylate (see Chemical Formula (b), n=9, viscosity: 58 mPa·s at a temperature of 25° C.), polyethylene glycol 600 diacrylate (see Chemical Formula (b), n=14, viscosity: 106 mPa·s at a temperature of 25° C.), polyethylene glycol 1000 diacrylate (see Chemical Formula (b), n=23, viscosity: 100 mPa·s at a temperature of 40° C.), propoxylated ethoxylated bisphenol A diacrylate (see Chemical Formula (c), viscosity: 500 mPa·s at a temperature of 25° C.), ethoxylated bisphenol A diacrylate (see Chemical Formula (d), viscosity: 1500 mPa·s at a temperature of 25° C.), 9,9-bis[4-(2-acryloyloxyethoxy)phenyl]fluorene (see Chemical Formula (e), viscosity: 91,000 mPa·s at a temperature of 60° C.), propoxylated bisphenol A diacrylate (see Chemical Formula (f), viscosity: 3000 mPa·s at a temperature of 25° C.), tricyclodecane dimethanol diacrylate (see Chemical Formula (g), viscosity: 120 mPa·s at a temperature of 25° C.), 1,10-decanediol diacrylate (see Chemical Formula (h), viscosity: 10 mPa·s at a temperature of 25° C.), 1,6-hexanediol diacrylate (see Chemical Formula (i), viscosity: 8 mPa·s at a temperature of 25° C.), 1,9-nonanediol diacrylate (see Chemical Formula (j), viscosity: 8 mPa·s at a temperature of 25° C.), dipropylene glycol diacrylate (see Chemical Formula (k), viscosity: 8 mPa·s at a temperature of 25° C.), tripropylene glycol diacrylate (see Chemical Formula (1), m+n=3, viscosity: 12 mPa·s at a temperature of 25° C.), polypropylene glycol 400 diacrylate (see Chemical Formula (1), m+n=7, viscosity: 34 mPa·s at a temperature of 25° C.), polypropylene glycol 700 diacrylate (see Chemical Formula (1), m+n=12, viscosity: 68 mPa·s at a temperature of 25° C.), and polytetramethylene glycol 650 diacrylate (see Chemical Formula (m), viscosity: 140 mPa·s at a temperature of 25° C.) produced by Shin Nakamura Chemical Co., Ltd. Further, other examples of the bifunctional acrylate monomer include dipropylene glycol diacrylate (viscosity: 10 mPa·s at a temperature of 25° C.), 1,6-hexanediol diacrylate (viscosity: 6.5 mPa·s at a temperature of 25° C.), tripropylene glycol diacrylate (viscosity: 12.5 mPa·s at a temperature of 25° C.), PO-modified neopentyl glycol diacrylate (viscosity: 20 mPa·s at a temperature of 25° C.), modified bisphenol A diacrylate (viscosity: 1100 mPa·s at a temperature of 25° C.), tricyclodecane dimethanol diacrylate (viscosity: 140 mPa·s at a temperature of 25° C.), PEG 400 diacrylate (viscosity: 60 mPa·s at a temperature of 25° C.), PEG 600 diacrylate (viscosity: 120 mPa·s at a temperature of 25° C.), and neopentyl glycol-hydroxypivalic acid ester diacrylate (viscosity: 25 mPa·s at a temperature of 25° C.) produced by DAICEL-ALLNEX LTD.

[Chem. 2-1]

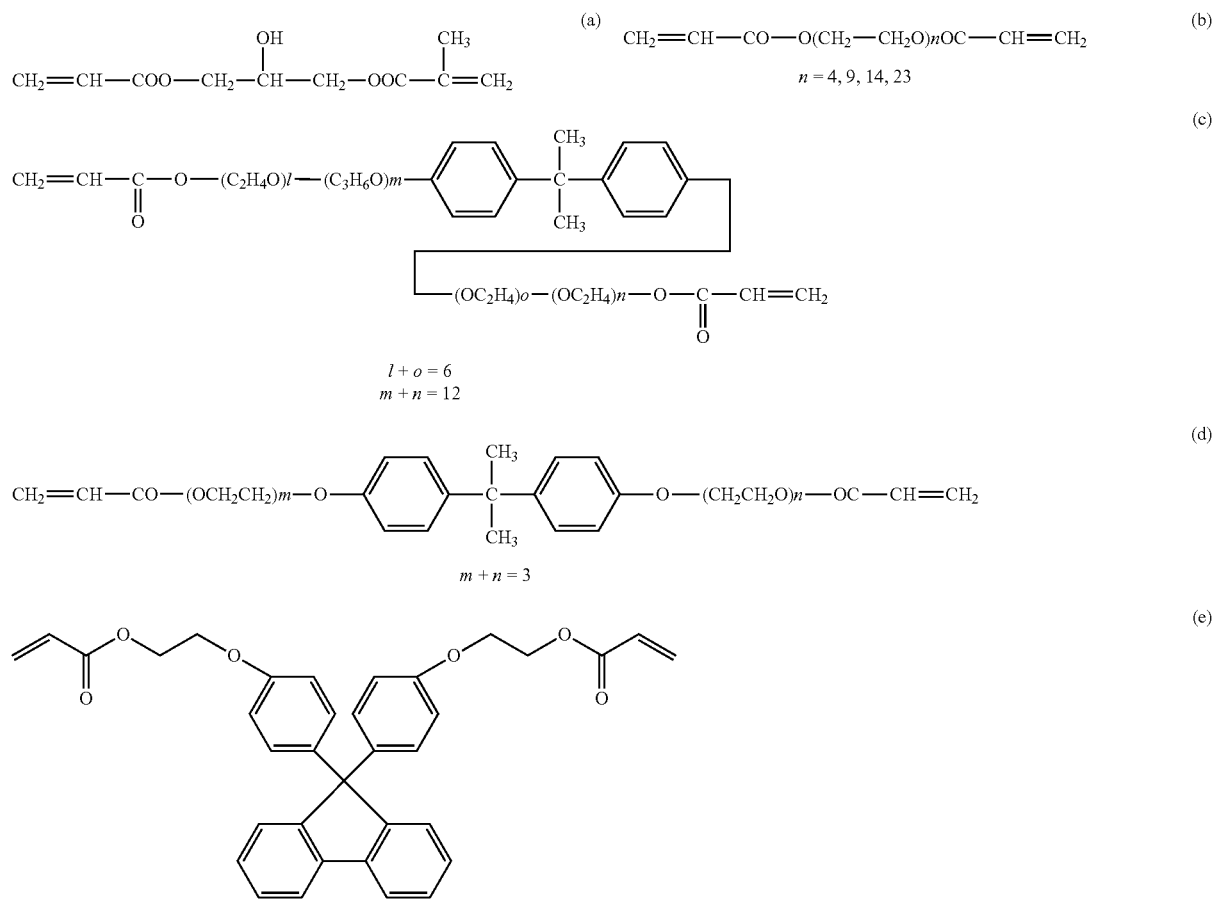

[Chem. 2-2]

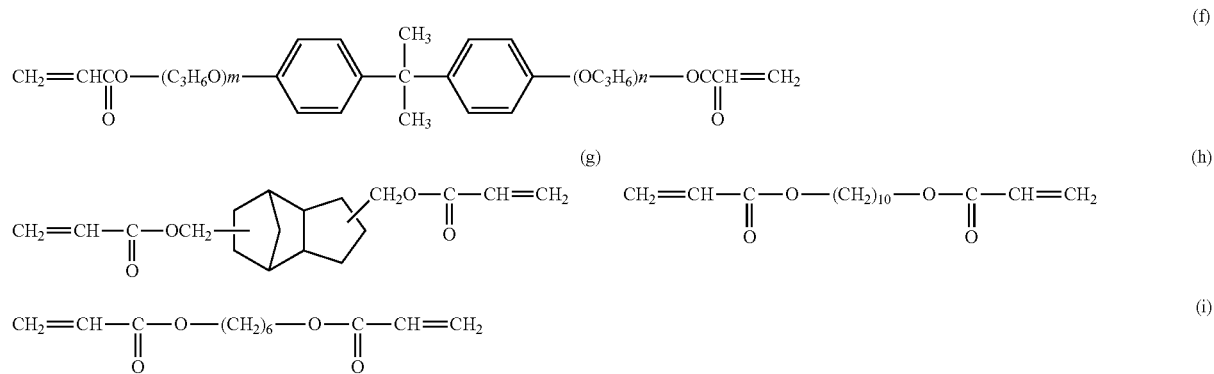

[Chem. 2-3]

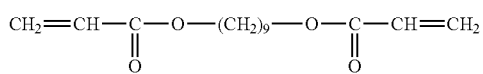
(j)

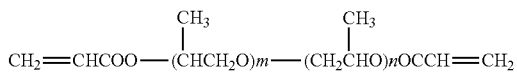
(k)

$m + n = 2$

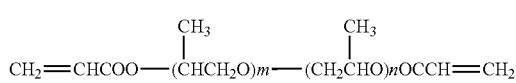

$m + n = 3, 7, 12$

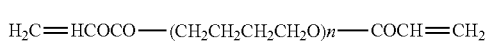 (l)

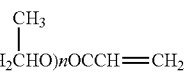 (m)

$n = 9$

Usable trifunctional acrylate monomers and polyfunctional acrylate monomers are compounds represented by Chemical Formula 3-1 to Chemical Formula 3-2. Specific examples thereof include ethoxylated isocyanuric acid triacrylate (see Chemical Formula (a), viscosity: 1,000 mPa·s at a temperature of 50° C.), ε-caprolactone modified tris-(2-acryloxyethyl) isocyanurate (see Chemical Formula (b), viscosity: 3,000 to 4,000 mPa·s at a temperature of 25° C.), ethoxylated glycerine triacrylate (EO: 9 mol) (see Chemical Formula (c), l+m+n=9, viscosity: 190 mPa·s at a temperature of 25° C.), ethoxylated glycerine triacrylate (EO: 20 mol) (see Chemical Formula (c), l+m+n=20, viscosity: 110 mPa·s at a temperature of 25° C.), pentaerythritol triacrylate (tri-ester: 37%) (see Chemical Formula (d), viscosity: 790 mPa·s at a temperature of 25° C.), pentaerythritol triacrylate (tri-ester: 55%) (see Chemical Formula (d), viscosity: 490 mPa·s at a temperature of 25° C.), pentaerythritol triacrylate (tri-ester: 57%) (see Chemical Formula (d), viscosity: 730 mPa·s at a temperature of 25° C.), trimethylolpropane triacrylate (see Chemical Formula (e), viscosity: 110 mPa·s at a temperature of 25° C.), ditrimethylolpropane tetraacrylate (see Chemical Formula (f), viscosity: 1,000 mPa·s at a temperature of 25° C.), ethoxylated pentaerythritol tetraacrylate (see Chemical Formula (g), viscosity: 350 mPa·s at a temperature of 25° C.), pentaerythritol tetraacrylate (see Chemical Formula (h), viscosity: 200 mPa·s at a temperature of 40° C.), dipentaerythritol polyacrylate (see Chemical Formula (i), viscosity: 6,500 mPa·s at a temperature of 25° C.), and dipentaerythritol hexaacrylate (see Chemical Formula (j), viscosity: 6,600 mPa·s at a temperature of 25° C.) produced by Shin Nakamura Chemical Co., Ltd. Further, examples of the polyfunctional acrylate monomer include dipentaerythritol pentaacrylate, phthalic acid monohydroxyethylacrylate, and isocyanuric acid ethylene oxide modified-diacrylate.

[Chem. 3-1]

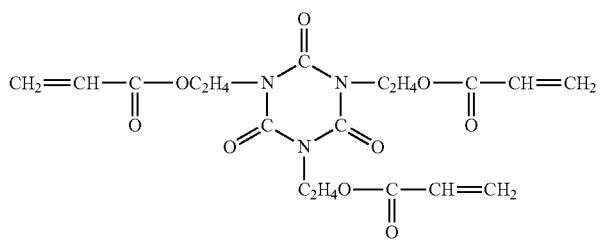
(a)

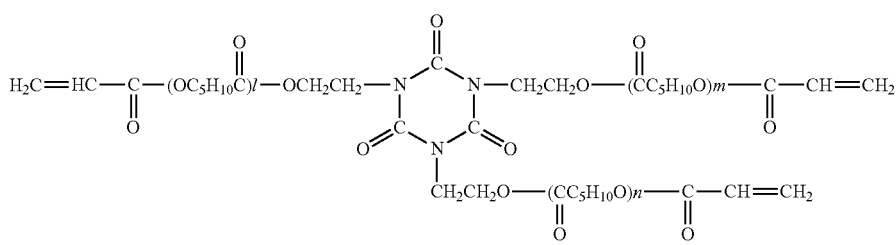

$l + m + n = 1$ (b)

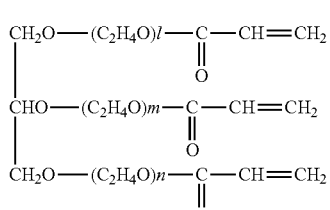
(c)

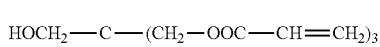
(d)

$l + m + n = 9.20$

-continued

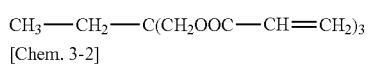
(e)

[Chem. 3-2]

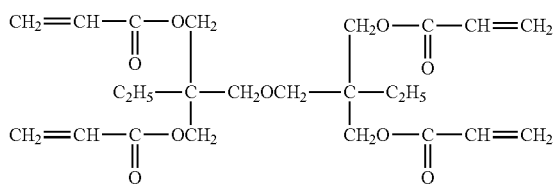
(f)

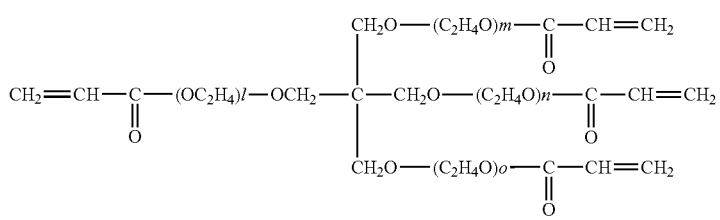
(g)

(h)

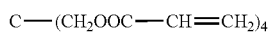

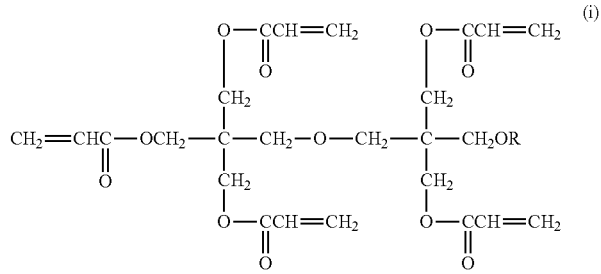
(i)

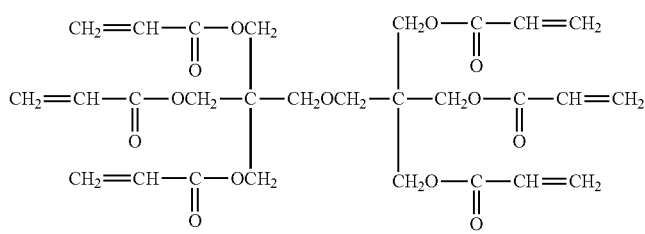
(j)

Other examples of the trifunctional acrylate monomer include pentaerythritol (tri/tetra) acrylate (viscosity: 1100 mPa·s at a temperature of 25° C.), trimethylolpropane triacrylate (viscosity: 100 mPa·s at a temperature of 25° C.), trimethylolpropane ethoxytriacrylate (viscosity: 60 mPa·s at a temperature of 25° C.), trimethylolpropane propoxytriacrylate (viscosity: 90 mPa·s at a temperature of 25° C.), and glycerin propoxytriacrylate (viscosity: 100 mPa·s at a temperature of 25° C.) produced by DAICEL-ALLNEX LTD. Other examples of the polyfunctional acrylate monomer having four or more functional groups include pentaerythritol ethoxytetraacrylate (viscosity: 160 mPa·s at a temperature of 25° C.), ditrimethylolpropane tetraacrylate (viscosity: 1,000 mPa·s at a temperature of 25° C.), pentaerythritol (tri/tetra) acrylate (viscosity: 700 mPa·s at a temperature of 25° C.), and dipentaerythritol hexaacrylate (viscosity: 6,900 mPa·s at a temperature of 25° C.) produced by DAICEL-ALLNEX LTD.

Usable monofunctional methacrylate monomers are compounds represented by Chemical Formula 4. Specific examples thereof include 2-methacryloyloxyethyl phthalic acid (see Chemical Formula (a), viscosity: 3,400 mPa·s at a temperature of 25° C.), methoxy polyethylene glycol 400 methacrylate (see Chemical Formula (b), n=9, viscosity: 23 mPa·s at a temperature of 25° C.), methoxy polyethylene glycol 1000 methacrylate (see Chemical Formula (b), n=23, viscosity: 55 mPa·s at a temperature of 40° C.), phenoxy ethylene glycol methacrylate (see Chemical Formula (c), viscosity: 7 mPa·s at a temperature of 25° C.), stearyl methacrylate (see Chemical Formula (d), viscosity: 8 mPa·s at a temperature of 30° C.), and 2-methacryloyloxyethyl succinate (see Chemical Formula (e), viscosity: 160 mPa·s at a temperature of 25° C.) produced by Shin Nakamura Chemical Co., Ltd.

[Chem. 4]

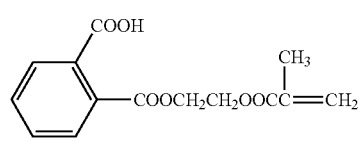
(a)

-continued

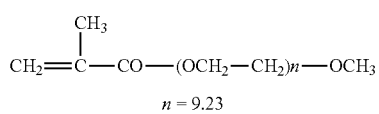

n = 9.23

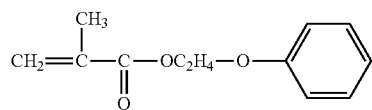

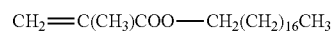

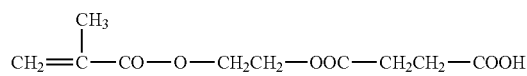

Usable bifunctional methacrylate monomers are compounds represented by Chemical Formula 5-1 and Chemical Formula 5-2. Specific examples thereof include ethylene glycol dimethacrylate (see Chemical Formula (a), viscosity: 3 mPa·s at a temperature of 25° C.), diethylene glycol dimethacrylate (see Chemical Formula (b), n=2, viscosity: 5 mPa·s at a temperature of 25° C.), triethylene glycol dimethacrylate (see Chemical Formula (b), n=3, viscosity: 9 mPa·s at a temperature of 25° C.), polyethylene glycol 200 dimethacrylate (see Chemical Formula (b), n=4, viscosity: 14 mPa·s at a temperature of 25° C.), polyethylene glycol 400 dimethacrylate (see Chemical Formula (b), n=9, viscosity: 35 mPa·s at a temperature of 25° C.), polyethylene glycol 600 dimethacrylate (see Chemical Formula (b), n=14, viscosity: 64 mPa·s at a temperature of 25° C.), polyethylene glycol 1000 dimethacrylate (see Chemical Formula (b), n=23, viscosity: 80 mPa·s at a temperature of 40° C.), ethoxylated bisphenol A dimethacrylate (see Chemical Formula (c), viscosity: 1000 mPa·s at a temperature of 25° C.), tricyclodecane dimethanol dimethacrylate (see Chemical Formula (d), viscosity: 100 mPa·s at a temperature of 25° C.), 1,10-decanediol dimethacrylate (see Chemical Formula (e), viscosity: 10 mPa·s at a temperature of 25° C.), 1,6-hexanediol dimethacrylate (see Chemical Formula (f), viscosity: 6 mPa·s at a temperature of 25° C.), 1,9-nonanediol dimethacrylate (see Chemical Formula (g), viscosity: 8 mPa·s at a temperature of 25° C.), neopentyl glycol dimethacrylate (see Chemical Formula (h), viscosity: 5 mPa·s at a temperature of 25° C.), ethoxylated polypropylene glycol 700 dimethacrylate (see Chemical Formula (i), viscosity: 90 mPa·s at a temperature of 25° C.), glycerin dimethacrylate (see Chemical Formula (j), viscosity: 40 mPa·s at a temperature of 25° C.), and polypropylene glycol 400 dimethacrylate (see Chemical Formula (k), viscosity: 27 mPa·s at a temperature of 25° C.) produced by Shin Nakamura Chemical Co., Ltd.

[Chem. 5-1]

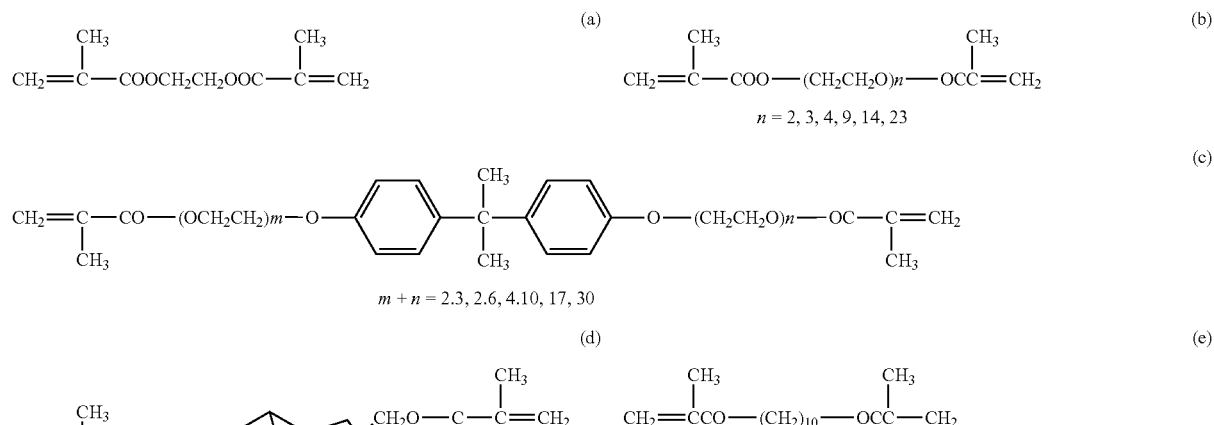

[Chem. 5-2]

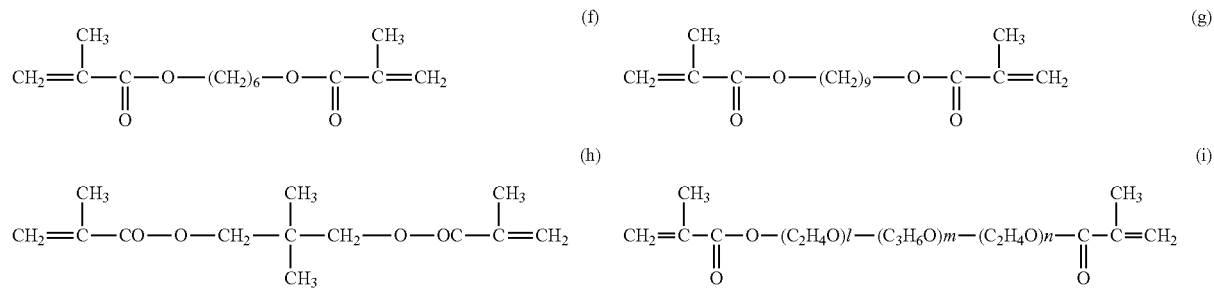

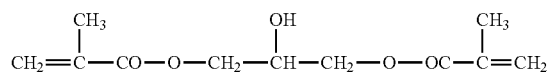

(j)

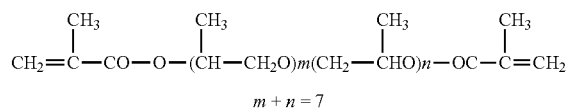

(k)

$m + n = 7$

Usable trifunctional methacrylate monomers are compounds represented by Chemical Formula 6. Specific examples thereof include trimethylolpropane trimethacrylate (viscosity: 42 mPa·s at a temperature of 25° C.) produced by Shin Nakamura Chemical Co., Ltd.

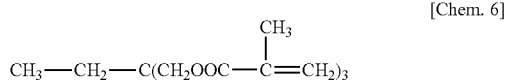

[Chem. 6]

Further, usable photopolymerizable (meth)acrylate oligomers are aromatic urethane acrylate, aliphatic urethane acrylate, polyester acrylate, and epoxy acrylate produced by DAICEL-ALLNEX LTD. Further, examples of the epoxy acrylate include bisphenol A epoxy acrylate, epoxyfied soybean oil acrylate, modified epoxy acrylate, fatty acid-modified epoxy acrylate, and amine-modified bisphenol A epoxy acrylate.

Examples of the photopolymerizable (meth)acrylate oligomer include acrylic acrylate such as polybasic acid-modified acrylic oligomer, and silicone acrylate.

However, preferred monofunctional (meth)acrylate monomers are isobornyl acrylate and ethoxylated phenylacrylate. Preferred bifunctional (meth)acrylate monomers are 2-hydroxy-3-(acryloyloxy)propyl methacrylate and dipropylene glycol diacrylate. Preferred trifunctional (meth)acrylate monomers are glycerin propoxytriacrylate and trimethylolpropane propoxytriacrylate. Preferred polyfunctional (meth)acrylate monomers having four or more functional groups are pentaerythritol ethoxytetraacrylate and ditrimethylolpropane tetraacrylate.

Note that, in the polymerizable compound of the present embodiment, a mixing ratio of the monofunctional (meth)acrylate monomer, the bifunctional (meth)acrylate monomer, the trifunctional (meth)acrylate monomer, and the polyfunctional (meth)acrylate monomer having four or more functional groups is not limited to Reference Examples and Examples described later, and may be set in a freely-selective manner so as to obtain effects of the present embodiment.

The ultraviolet curable resin according to the present embodiment preferably contains a photopolymerization initiator for accelerating ultraviolet light curing, in addition to the above-mentioned polymerizable compound. The photopolymerization initiator is a compound that initiates a polymerization reaction of the photopolymerizable monomer or the photopolymerizable oligomer. The photopolymerization initiator is a substance that absorbs a light component having a specific wavelength from ultraviolet light, is excited, and then generates radicals.

For example, at least one kind selected from a group consisting of a benzoin ether-based photopolymerization initiator, a ketal-based photopolymerization initiator, an acetophenone-based photopolymerization initiator, a benzophenone-based photopolymerization initiator, or a thioxanthone-based photopolymerization initiator may be used as the photopolymerization initiator. Note that those photopolymerization initiators are merely examples, and the present embodiment is not limited thereto. Specifically, various kinds of photopolymerization initiators may be used in accordance with purposes.

The ultraviolet curable resin according to the present embodiment contains the above-mentioned polymerizable compound as a main component. Further, the ultraviolet curable resin according to the present embodiment may contain other monomers and oligomers in addition to the above-mentioned polymerizable compound. Moreover, the ultraviolet curable resin may contain at least one of the additives listed below. Usable additives include photopolymerization initiating assistant agents, anti-adhesive agents, fillers, plasticizers, non-reactive polymers, coloring agents, flame retardants, flame retardant assistant agents, anti-softening agents, mold release agents, desiccants, dispersants, wetting agents, anti-settling agents, thickeners, anti-electrification agents, antistatic agents, matting agents, antiblocking agents, anti-skinning agents, and surfactants.

The anti-corrosive material according to the present embodiment further contains the anti-rust agent. When the metal terminal connected to the coated wire is subjected to tin plating or the like as described above, the anti-corrosive material peels off together with the tin plated-part from the metal terminal, and water penetrates, which causes corrosion. The anti-rust agent functions as a protection component such as tin plating. In other words, the anti-rust agent forms a protection film between the metal member and the ultraviolet curable resin. Moreover, peeling at the boundary surface between the metal member and the anti-corrosive material can be prevented, and hence process of corrosion can be delayed.

Examples of the anti-rust agent include benzotriazole, zinc cyanurate, tolyltriazole, dicyclohexyl ammonium nitrite, dicyclohexyl ammonium salicylate, monoethanolamine benzoate, dicyclohexyl ammonium benzoate, diisopropyl ammonium benzoate, diisopropyl ammonium nitrite, cyclohexyl amine carbamate, nitronaphthalene ammonium nitrite, cyclohexyl amine benzoate, dicyclohexyl ammonium cyclohexanecarboxylate, cyclohexyl amine cyclohexanecarboxylate, dicyclohexyl ammonium acrylate, and cyclohexyl amine acrylate. Among those, benzotriazole or zinc cyanurate is preferred.

In the present embodiment, a content amount of the anti-rust agent in the anti-corrosive material is 0.05 to 5 parts by mass for 100 parts by mass of the ultraviolet curable resin. In a case of a benzotriazole-based anti-rust agent, the content amount is preferably 0.3 to 3 parts by mass, more preferably, 0.5 to 2.5 parts by mass. In a case of a zinc cyanurate, the content amount is preferably 0.05 to 0.5 parts by mass, more preferably, 0.05 to 0.2 parts by mass. When the content amount of the anti-rust agent is less than 0.05 parts by mass, a protection effect for the metal member is insufficient. Further, when the content amount of the anti-rust agent exceeds 5 parts by mass, a protection effect for the metal member and cost effectiveness are not well balanced. For example, when benzotriazole or another derivative is used as the anti-rust agent, its ultraviolet light absorption property degrades ultraviolet light curability, and degrades adhesiveness.

As described above, the anti-corrosive material according to the present embodiment contains the ultraviolet curable resin and the anti-rust agent described above. For this reason, the anti-corrosive material is cured instantaneously through irradiation with ultraviolet light, and a washing step or a drying step is not required. Thus, subsequent steps can be performed immediately, and the process can be shortened. However, in a case where the viscosity of the ultraviolet curable resin is excessively high, when the ultraviolet curable resin is applied to the joint, the application thickness is excessively increased. As a result, the thickness of the coating (sealing member) that is obtained through curing is increased. For this reason, as described later, when a metal terminal is accommodated in a connector housing, the anti-corrosive material cannot be inserted into a cavity of the connector housing. Thus, there may be a risk that an existing connector housing cannot be used.

In view of this, the anti-corrosive material according to the present embodiment has a viscosity of 18,900 mPa·s or less, the viscosity being measured at 25° C. according to JIS Z8803 (the method of measuring a viscosity of a liquid). For this reason, the application thickness can be prevented from being excessively increased, and the thickness of the coating (sealing member) that is obtained through curing is not increased. Thus, an existing connector housing can be used. Note that the minimum value of the viscosity of the anti-corrosive material is not particularly limited, and may be set to 300 mPa·s, for example. When the viscosity of the anti-corrosive material is equal to or greater than this value, dripping during application to the joint is suppressed. Thus, the thickness of the coating that is obtained through curing can be substantially even, and anti-corrosive performance can be improved.

Note that the viscosity of the anti-corrosive material changes depending on a viscosity of each of the photopolymerizable (meth)acrylate monomer and the photopolymerizable (meth)acrylate oligomer, and an added amount of each of the monomer and the oligomer. Further, unless the polymerizable compound is irradiated with ultraviolet light to advance a polymerization reaction, the monomers, and the monomers and the oligomers are not polymerized to increase the viscosity of the polymerizable compound. For this reason, the viscosity of the anti-corrosive material, which is obtained by adjusting the viscosity and the added amount of each of the monomer and the oligomer, can be set to 18,900 mPa·s or less.

As described above, the anti-corrosive material according to the present embodiment includes the ultraviolet curable resin including the polymerizable compound and the anti-rust agent. The polymerizable compound includes at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803.

In the present embodiment, the ultraviolet curable resin in which the (meth)acrylate monomer having a small number of functional groups and the (meth)acrylate monomer having a large number of functional groups are mixed is used as the anti-corrosive material. For this reason, the cured object to be obtained has an appropriate cross linking density, and hence can have improved elongation in addition to strength, hardness, and surface curability. Further, when the monomer contained in the ultraviolet curable resin is constituted of only a polyfunctional (meth)acrylate monomer having three or more functional groups, depth curability is reduced, the resin in the anti-corrosive material is not sufficiently cured and peels off from the joint, and anti-corrosive performance is reduced in some cases. However, in the present embodiment, the ultraviolet curable resin contains a (meth)acrylate compound having a small number of functional groups. Thus, reduction of depth curability can be suppressed, peeling can be prevented, and anti-corrosive performance can be improved.

Further, the anti-corrosive material contains a certain amount of the anti-rust agent. Thus, when the anti-corrosive material is applied to the joint between the conductor of the wire and the metal terminal, the protection film is formed between the joint and the ultraviolet curable resin. With this, peeling at the boundary surface between the joint and the anti-corrosive material can be prevented, and hence process of corrosion can be delayed.

Further, the anti-corrosive material has a viscosity that is equal to or lower than a predetermined value. Thus, the application thickness is prevented from being excessively increased, and increase in thickness of the coating that is obtained through curing can be prevented. Moreover, the anti-corrosive material is cured instantaneously through irradiation with ultraviolet light, and a washing step or a drying step is not required. Thus, the process can be shortened. Further, in the present embodiment, the anti-corrosive material in a liquid form is applied to the joint, and is irradiated with ultraviolet light and cured. Thus, when the wire and the joint have any shapes, a sealing member excellent in anti-corrosive performance can be formed.

[Wire with Terminal]

Figure 2:
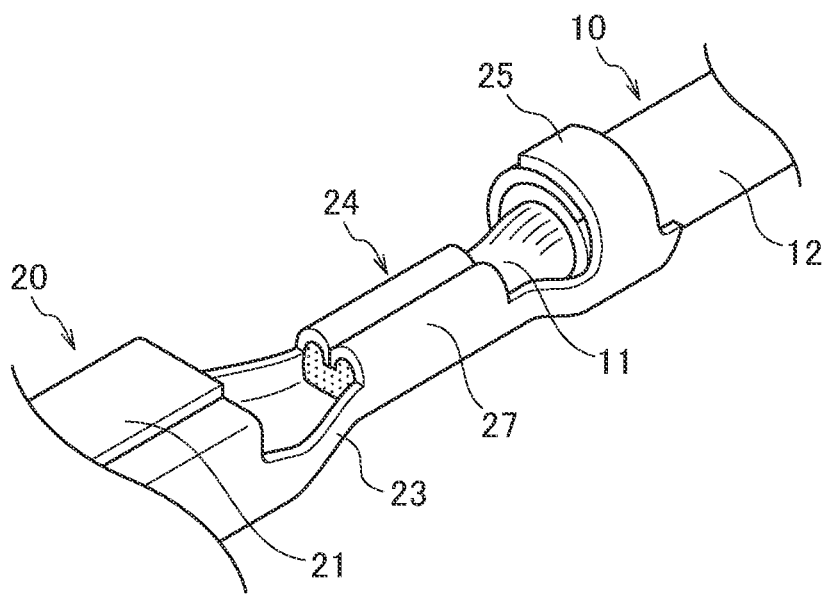
FIG. 2 is a schematic view of the wire with a terminal according to the present embodiment for illustrating a state in which the wire is connected to the metal terminal.
Figure 3:
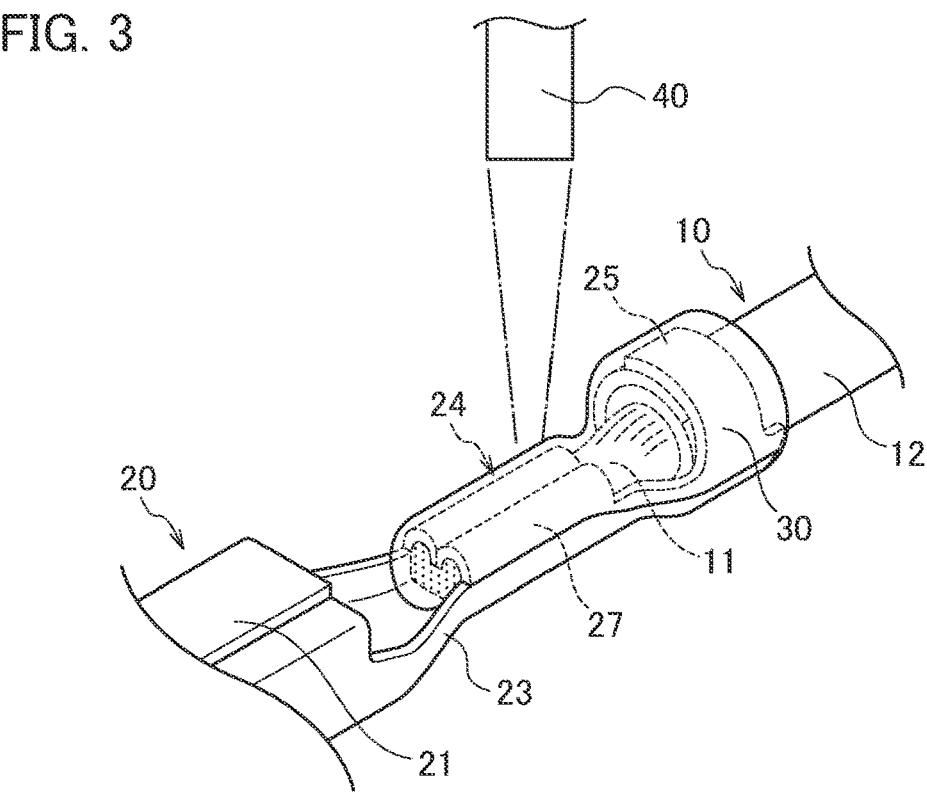
FIG. 3 is a schematic view of the wire with a terminal according to the present embodiment for illustrating a state in which an anti-corrosive material is applied to a joint between a metal terminal and a conductor and is cured.

Next, a wire with a terminal according to the present embodiment is described. As illustrated in FIG. 1 to FIG. 3, a wire with a terminal 1 according to the present embodiment includes a wire 10 and a metal terminal 20. The wire 10 includes a conductor 11 having conductivity and a wire covering member 12 configured to cover the conductor 11. The metal terminal 20 is connected to the conductor 11 of the wire 10. Moreover, the wire with a terminal 1 includes a sealing member 30 configured to cover a joint between the conductor 11 and the metal terminal 20, the sealing member 30 being formed by curing the above-mentioned anti-corrosive material.

The metal terminal 20 of the wire with a terminal 1 is a female type, and includes an electrical connection portion 21 at its front part, which is connected to a mating terminal (not shown). The electrical connection portion 21 includes a built-in spring piece engageable with the mating terminal, and has a box-like shape. Moreover, the metal terminal 20 includes a wire connection portion 22 at its rear part. The wire connection portion 22 is connected by crimping with respect to the terminal portion of the wire 10 through intermediation of a connection portion 23.

The wire connection portion 22 includes a conductor press-fitting portion 24 positioned on the front side and a covering member crimping portion 25 positioned on the rear side.

The conductor press-fitting portion 24 on the front side is brought into direct contact with the conductor 11 that is exposed by removing the wire covering member 12 at the terminal portion of the wire 10, and includes a bottom plate portion 26 and a pair of conductor crimping pieces 27. The pair of conductor crimping pieces 27 extend upward from both lateral sides of the bottom plate portion 26, and are bent inward so as to wrap the conductor 11 of the wire 10, thereby crimping the conductor 11 under a close contact state with the upper surface of the bottom plate portion 26. With the bottom plate portion 26 and the pair of conductor crimping pieces 27, the conductor press-fitting portion 24 is formed to have a substantially U-like shape in a cross-sectional view.

Further, the covering member crimping portion 25 on the rear side is brought into direct contact with the wire covering member 12 at the terminal portion of the wire 10, and includes a bottom plate portion 28 and a pair of covering member crimping pieces 29. The pair of covering member crimping pieces 29 extend upward from both lateral sides of the bottom plate portion 28, and are bent inward so as to wrap a part having the wire covering member 12, thereby crimping the wire covering member 12 under a close contact state with the upper surface of the bottom plate portion 28. With the bottom plate portion 28 and the pair of covering member crimping pieces 29, the covering member crimping portion 25 is formed to have a substantially U-like shape in a cross-sectional view. Here, a common base plate portion is formed continuously from the bottom plate portion 26 of the conductor press-fitting portion 24 to the bottom plate portion 28 of the covering member crimping portion 25.

In the present embodiment, as illustrated in FIG. 1 and FIG. 2, the terminal portion of the wire 10 is inserted into the wire connection portion 22 of the metal terminal 20 having the above-mentioned configuration. With this, the conductor 11 of the wire 10 is placed on the upper surface of the bottom plate portion 26 of the conductor press-fitting portion 24. At the same time, the portion of the wire 10 with the wire covering member 12 is placed on the upper surface of the bottom plate portion 28 of the covering member crimping portion 25. Further, the wire connection portion 22 and the terminal portion of the wire 10 are pressed against each other, and thus the conductor press-fitting portion 24 and the covering member crimping portion 25 are deformed. Specifically, the pair of conductor crimping pieces 27 of the conductor press-fitting portion 24 are bent inward so as to wrap the conductor 11, thereby crimping the conductor 11 under a close contact state with the upper surface of the bottom plate portion 26. Moreover, the pair of covering member crimping pieces 29 of the covering member crimping portion 25 are bent inward so as to wrap a part having the wire covering member 12, thereby crimping the wire covering member 12 under a close contact state with the upper surface of the bottom plate portion 28. In this manner, the metal terminal 20 and the wire 10 can be connected to each other through press fitting.

Further, as illustrated in FIG. 3, in the present embodiment, the sealing member 30 covers the connection portion 23, the wire connection portion 22, the conductor 11 and the upper part of the wire covering member 12, which are covered with the wire connection portion 22. Specifically, the sealing member 30 covers a part of the connection portion 23 over the boundary between the conductor press-fitting portion 24 and the distal end of the conductor 11 of the conductor 10, and covers and a part of the wire covering member 12 over the boundary between the covering member crimping portion 25 and the wire covering member 12. Thus, the sealing member 30 covers the conductor 11 and the upper part of the wire covering member 12, which are covered with the wire connection portion 22, and thus corrosion of the joint between the conductor 11 and the wire connection portion 22 can be suppressed.

The sealing member 30 is a cured object obtained by irradiating the anti-corrosive material containing the above-mentioned ultraviolet curable resin with ultraviolet light and curing the anti-corrosive material.

Metal having high conductivity may be used as a material of the conductor 11 of the wire 10. Usable materials include copper, a copper alloy, aluminum, and an aluminum alloy. Further, the surface of the conductor 11 may be subjected to tin plating. However, in recent years, reduction in weight of the wire harness has been demanded. In view of this, aluminum or an aluminum alloy having light weight is preferably used as the conductor 11. For this reason, the conductor 11 preferably includes an elemental wire formed of aluminum or an aluminum alloy.

A resin capable of securing an electric insulation property may be used as a material of the wire covering member 12 configured to cover the conductor 11. For example, a resin containing polyvinyl chloride (PVC) as a main component or an olefin-based resin may be used. Specific examples of the olefin-based resin include polyethylene (PE), polypropylene (PP), an ethylene copolymer, and a propylene copolymer.

Metal having high conductivity may be used as a material (terminal material) of the metal terminal 20. For example, at least one of copper, a copper alloy, stainless steel, copper subjected to tin plating, a copper alloy subjected to tin plating, or stainless steel subjected to tin plating may be used. Further, at least one of copper, a copper alloy, or stainless steel that are subjected to gold plating may be used. Alternatively, at least one of copper, a copper alloy, or stainless steel that are subjected to silver plating may be used. Note that the metal terminal preferably contains copper or a copper alloy.

Next, a method of manufacturing the wire with a terminal according to the present embodiment is described. As illustrated in FIG. 1 and FIG. 2, first, in the wire with a terminal 1, the terminal portion of the wire 10 is inserted into the wire connection portion 22 of the metal terminal 20. With this, the conductor 11 of the wire 10 is placed on the upper surface of the bottom plate portion 26 of the conductor press-fitting portion 24. At the same time, the portion of the wire 10 with the wire covering member 12 is placed on the upper surface of the bottom plate portion 28 of the covering member crimping portion 25. Further, the pair of conductor crimping pieces 27 of the conductor press-fitting portion 24 are bent inward, thereby crimping the conductor 11 under a close contact state with the upper surface of the bottom plate portion 26. Moreover, the pair of covering member crimping pieces 29 of the covering member crimping portion 25 are bent inward, thereby crimping the wire covering member 12 under a close contact with the upper surface of the bottom plate portion 28. With this, the metal terminal 20 and the wire 10 can be connected to each other.

Subsequently, the anti-corrosive material is applied to the joint between the metal terminal 20 and the wire 10. At this stage, the method of applying the anti-corrosive material is not particularly limited, and a coating machine of a dispenser type may be used, for example. As illustrated in FIG. 3, the anti-corrosive material is applied so as to cover the joint. Note that the anti-corrosive material preferably covers a part of the connection portion 23 over the boundary between the conductor press-fitting portion 24 and the distal end of the conductor 11 of the wire 10 and a part of the wire covering member 12 over the boundary between the covering member crimping portion 25 and the wire covering member 12 so as to secure high anti-corrosive performance.

Subsequently, the metal terminal 20 and the wire 10 to which the ultraviolet curable resin is applied are irradiated with ultraviolet light through use of an ultraviolet light irradiation device 40. Any one of a mercury lamp, a high-pressure mercury lamp, an ultra high-pressure mercury lamp, a metal halide lamp, and an LED lamp may be used as the ultraviolet light irradiation device 40. An irradiation amount and an irradiation time of ultraviolet light may be set appropriately in accordance with the ultraviolet curable resin to be used and the application amount. Further, the ultraviolet curable resin is irradiated with ultraviolet light, and is cured instantaneously before non-uniformity is caused in the ultraviolet curable resin. With this, the sealing member 30 is formed on the surfaces of the metal terminal 20 and the wire 10.

Note that the ultraviolet curable resin is known to cause reaction inhibition when being brought into contact with oxygen through curing. One of the causes of the reaction inhibition is oxygen in the air that reacts with radicals generated by the photopolymerization initiator and eliminates the radicals. With this, a polymerization reaction of the ultraviolet curable resin is reduced, and hence curing of the resin is not sufficiently promoted. For this reason, the ultraviolet curable resin that is less affected by the oxygen curing inhibition is preferably used.

Note that a step of cooling the sealing member 30 may be performed as required after the ultraviolet curable resin is irradiated with ultraviolet light and cured. Examples of the method of cooling the sealing member 30 include a cooling method in which air is sent and brought into contact with the sealing member 30, for example.

As described above, the wire with a terminal according to the present embodiment includes the sealing member 30 obtained by curing the above-mentioned anti-corrosive material with ultraviolet light. Further, the anti-corrosive material has a viscosity that is equal to or lower than a predetermined value. Thus, the application thickness is prevented from being excessively increased, and increase in thickness of the coating that is obtained through curing can be prevented. As a result, as described later, it is not required to change a pitch dimension of a connector housing. Thus, the wire with a terminal according to the present embodiment can be inserted into a connector housing having a conventional size. For this reason, it is not required to change design of a connector housing for the wire with a terminal according to the present embodiment.

[Wire Harness]

Figure 4:
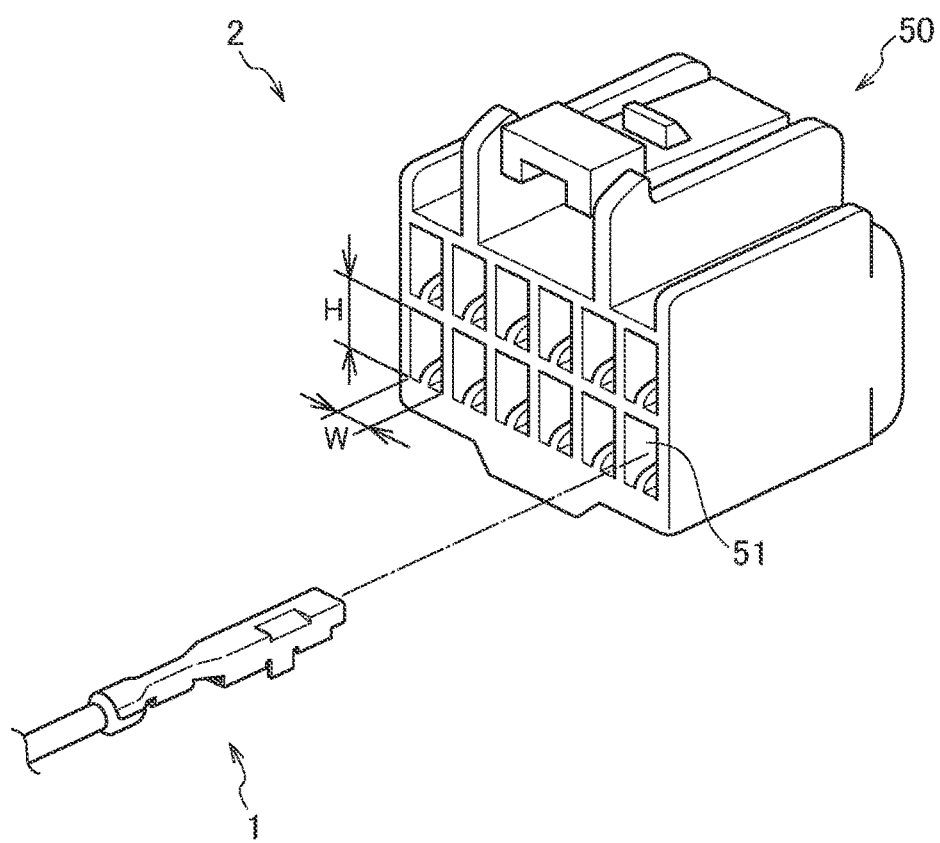
FIG. 4 is a perspective view illustrating a wire harness according to the present embodiment.

Next, a wire harness according to the present embodiment is described. The wire harness according to the present embodiment includes the above-mentioned wire with a terminal. Specifically, as illustrated in FIG. 4, a wire harness 2 includes a connector housing 50 and the above-mentioned wire with a terminal 1.

On a front surface side of the connector housing 50, a plurality of mating-side terminal mounting portions (not shown) to which mating terminals (not shown) are mounted are provided. Further, on a back surface side of the connector housing 50, a plurality of cavities 51 are provided. Each of the cavities 51 has a substantially rectangular opening that allows the metal terminal 20 and the sealing member 30 of the wire with a terminal 1 to be mounted therein. Moreover, the opening of each of the cavities 51 is formed to be slightly larger than the cross-section of the metal terminal 20 and the sealing member 30. Further, the metal terminal 20 is mounted to the connector housing 50, and the wire 10 is drawn out from the back surface side of the connector housing 50.

Here, as described above, the anti-corrosive material according to the present embodiment has a viscosity that is equal to or lower than a predetermined value. Thus, the application thickness is prevented from being excessively increased, and increase in thickness of the coating (sealing member) that is obtained through curing can be prevented. For this reason, the width of the sealing member of the wire with a terminal 1 can be set smaller than an opening width W of the cavity 51 of the connector housing 50 into which the metal terminal 20 and the sealing member 30 are inserted. Moreover, the maximum height of the anti-corrosive material of the wire with a terminal 1 can be set smaller than an opening height H of the cavity 51 of the connector housing 50.

As described above, the thickness of the sealing member 30 of the present embodiment can be reduced. Thus, it is not required to particularly change the pitch dimension of the connector housing 50. For this reason, the wire with a terminal can be inserted into a connector housing having a conventional size. Thus, it is not required to change design of a connector housing particularly for the wire with a terminal, and a conventional connector housing can be used.

EXAMPLES

The present embodiment is further described below in detail with Examples, Comparative Examples, and Reference Examples. However, the present embodiment is not limited to those examples.

Reference Example

The following compounds were used as oligomers, monomers, and a photopolymerization initiator when a wire with a terminal in each of the reference examples and reference comparative examples was produced.

Oligomer 1: EBECRYL (registered trademark) 8402 (aliphatic urethane acrylate) produced by DAICEL-ALLNEX LTD., average molecular weight Mw: 1,000

Oligomer 2: EBECRYL 4858 (aliphatic urethane acrylate) produced by DAICEL-ALLNEX LTD., average molecular weight Mw: 450

Monofunctional monomer: IBOA (isobornyl acrylate) produced by DAICEL-ALLNEX LTD.

Bifunctional monomer: TPGDA (tripropylene glycol diacrylate) produced by DAICEL-ALLNEX LTD.

Trifunctional monomer 1: PETRA (pentaerythritol triacrylate) produced by DAICEL-ALLNEX LTD.

Trifunctional monomer 2: TMPTA (trimethylolpropane triacrylate) produced by DAICEL-ALLNEX LTD.

Polyfunctional monomer: EBECRYL 140 (ditrimethylolpropane tetraacrylate) produced by DAICEL-ALLNEX LTD.

Photopolymerization initiator: IRGACURE (registered trademark) 369 produced by BASF SE Reference Example 1

First, the monofunctional monomer, the bifunctional monomer, and the photopolymerization initiator were mixed in mass proportions of 90, 10, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp.

Reference Example 2

The monofunctional monomer, the bifunctional monomer, the trifunctional monomer 1, the polyfunctional monomer, and the photopolymerization initiator were mixed in mass proportions of 20, 5, 5, 5, and 2, respectively, with respect to 100 parts by mass of the oligomer 1 to prepare an anti-corrosive material. Except for this, a wire with a terminal in this example was prepared in the same manner as in Reference Example 1.

Reference Example 3

The monofunctional monomer, the bifunctional monomer, the trifunctional monomer 1, and the photopolymerization initiator were mixed in mass proportions of 3, 3, 3, and 2, respectively, with respect to 100 parts by mass of the oligomer 1 to prepare an anti-corrosive material. Except for this, a wire with a terminal in this example was prepared in the same manner as in Reference Example 1.

Reference Example 4

The monofunctional monomer, the bifunctional monomer, the polyfunctional monomer, and the photopolymerization initiator were mixed in mass proportions of 30, 5, 5, and 2, respectively, with respect to 100 parts by mass of the oligomer 1 to prepare an anti-corrosive material. Except for this, a wire with a terminal in this example was prepared in the same manner as in Reference Example 1.

Reference Example 5

The monofunctional monomer, the trifunctional monomer 1, and the photopolymerization initiator were mixed in mass proportions of 20, 5, and 2, respectively, with respect to 100 parts by mass of the oligomer 1 to prepare an anti-corrosive material. Except for this, a wire with a terminal in this example was prepared in the same manner as in Reference Example 1.

Reference Example 6

The bifunctional monomer, the polyfunctional monomer, and the photopolymerization initiator were mixed in mass proportions of 5, 5, and 2, respectively, with respect to 100 parts by mass of the oligomer 1 to prepare an anti-corrosive material. Except for this, a wire with a terminal in this example was prepared in the same manner as in Reference Example 1.

Reference Comparative Example 1

The monofunctional monomer and the photopolymerization initiator were mixed in mass proportions of 100 and 2, respectively, with respect to 100 parts by mass of the oligomer 1 to prepare an anti-corrosive material. Except for this, a wire with a terminal in this example was prepared in the same manner as in Reference Example 1.

Reference Comparative Example 2

The bifunctional monomer and the photopolymerization initiator were mixed in mass proportions of 65 and 2, respectively, with respect to 100 parts by mass of the oligomer 1 to prepare an anti-corrosive material. Except for this, a wire with a terminal in this example was prepared in the same manner as in Reference Example 1.

Reference Comparative Example 3

The trifunctional monomer and the photopolymerization initiator were mixed in mass proportions of 45 and 2, respectively, with respect to 100 parts by mass of the oligomer 1 to prepare an anti-corrosive material. Except for this, a wire with a terminal in this example was prepared in the same manner as in Reference Example 1.

Reference Comparative Example 4

The polyfunctional monomer and the photopolymerization initiator were mixed in mass proportions of 5 and 2, respectively, with respect to 100 parts by mass of the oligomer 2 to prepare an anti-corrosive material. Except for this, a wire with a terminal in this example was prepared in the same manner as in Reference Example 1.

Reference Comparative Example 5

The trifunctional monomer, the polyfunctional monomer, and the photopolymerization initiator were mixed in mass proportions of 5, 5, and 2, respectively, with respect to 100 parts by mass of the oligomer 1 to prepare an anti-corrosive material. Except for this, a wire with a terminal in this example was prepared in the same manner as in Reference Example 1.

(Viscosity Measurement)

A viscosity of the anti-corrosive material prepared in each of the reference examples and reference comparative examples was measured at a temperature of 25° C. according to JIS Z8803. The viscosity was measured through use of a B-type rotational viscometer (TH-IOH) at 50 rpm.

(Evaluation on Anti-Corrosive Performance)

The anti-corrosive performance of the wire with a terminal prepared in each of the reference examples and reference comparative examples was evaluated based on the measurement method specified in Japanese Industrial Standards JIS C60068-2-11 (Basic Environmental Testing Procedures Part 2: Tests-Test Ka: Salt mist). Specifically, the joint between the conductor and the metal terminal of the wire with a terminal was subjected to a salt mist test. More specifically, the test was performed under the following conditions: a temperature of 35±2° C., relative humidity (RH) of 85% or higher, a concentration of salt water of 5±1%, and the test period of 4 days. After that, whether corrosion (rust) was generated at the joint in each example was determined by visual observation. A case where corrosion was not confirmed was evaluated as "satisfactory". Otherwise, an evaluation as "poor" was given.

(Evaluation on Connector Housing Insertion Performance)

The wire with a terminal in each example was inserted into a connector housing. Whether the sealing member was brought into contact with a circumferential wall of a cavity at the time of insertion into the connector housing was determined by visual observation. A case where the sealing member was not brought into contact with the circumferential wall of the cavity was evaluated as "satisfactory". Otherwise, an evaluation as "poor" was given. Note that, in this evaluation, a wire ALVSS 2sq was used, and a connector housing 2.3II was used.

The oligomers, the monomers, and the photopolymerization initiator that were used in Reference Examples and Reference Comparative Examples, and the results of viscosities of the anti-corrosive materials, evaluation on anti-corrosive performance, and evaluation on connector housing insertion performance are shown in Table 1 and Table 2.

monomer or the bifunctional (meth)acrylate monomer and at least one of the trifunctional (meth)acrylate monomer or the polyfunctional (meth)acrylate monomer were used in combination, the satisfactory results were also given in evaluation on anti-corrosive performance and evaluation on connector housing insertion performance.

In contrast, in Reference Comparative Examples 1 to 4 in which the monofunctional (meth)acrylate monomer, the bifunctional (meth)acrylate monomer, the trifunctional (meth)acrylate monomer, or the polyfunctional (meth)acrylate monomer was used alone, the insufficient results were given with regard to anti-corrosive performance. Further, in Reference Comparative Example 5 in which the trifunc-

TABLE 1

| | | Product name | Reference Example 1 | Reference Example 2 | Reference Example 3 | Reference Example 4 | Reference Example 5 | Reference Example 6 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 90 | 20 | 3 | 30 | 20 | — |
| | Bifunctional monomer (parts by mass) | TPGDA | 10 | 5 | 3 | 5 | — | 5 |
| | Trifunctional monomer 1 (parts by mass) | PETRA | — | 5 | 3 | — | 5 | — |
| | Trifunctional monomer 2 (parts by mass) | TMPTA | — | — | — | — | — | — |
| | Polyfunctional monomer (parts by mass) | EBECRYL 140 | — | 5 | — | 5 | — | 5 |
| | Photopolymerization initiator (parts by mass) | IRGACURE 369 | 2 | 2 | 2 | 2 | 2 | 2 |
| Evaluation | Viscosity (mPa · s) | | 300 | 2800 | 9600 | 2200 | 4300 | 18900 |
| | Connector insertion performance | | Satisfactory | Satisfactory | Satisfactory | Satisfactory | Satisfactory | Satisfactory |
| | Anti-corrosive performance | | Satisfactory | Satisfactory | Satisfactory | Satisfactory | Satisfactory | Satisfactory |

TABLE 2

| | | Product name | Reference Comparative Example 1 | Reference Comparative Example 2 | Reference Comparative Example 3 | Reference Comparative Example 4 | Reference Comparative Example 5 |
|---|---|---|---|---|---|---|---|
| Composition | Oligomer 1 (parts by mass) | EBECRYL 8402 | 100 | 100 | 100 | — | 100 |
| | Oligomer 2 (parts by mass) | EBECRYL 4858 | — | — | — | 100 | — |
| | Monofunctional monomer (parts by mass) | IBOA | 100 | — | — | — | — |
| | Bifunctional monomer (parts by mass) | TPGDA | — | 65 | — | — | — |
| | Trifunctional monomer 1 (parts by mass) | PETRA | — | — | — | — | — |
| | Trifunctional monomer 2 (parts by mass) | TMPTA | — | — | 45 | — | 5 |
| | Polyfunctional monomer (parts by mass) | EBECRYL 140 | — | — | — | 5 | 5 |
| | Photopolymerization initiator (parts by mass) | IRGACURE 369 | 2 | 2 | 2 | 2 | 2 |
| Evaluation | Viscosity (mPa · s) | | 300 | 1000 | 5000 | 7000 | 20000 |
| | Connector insertion performance | | Satisfactory | Satisfactory | Satisfactory | Satisfactory | Satisfactory |
| | Anti-corrosive performance | | Poor | Poor | Poor | Poor | Poor |

As shown in Table 1, in Reference Example 1 in which the monofunctional (meth)acrylate monomer and the bifunctional (meth)acrylate monomer were used in combination, the satisfactory results were given in evaluation on anti-corrosive performance and evaluation on connector housing insertion performance. Further, in Reference Examples 2 to 6 in which at least one of the monofunctional (meth)acrylate tional (meth)acrylate monomer and the polyfunctional (meth)acrylate monomer were used in combination, the inside of the anti-corrosive material was not sufficiently cured, and the anti-corrosive material peeled off. Thus, the insufficient results were given with regard to anti-corrosive performance. Moreover, the anti-corrosive material in Reference Comparative Example 5 had a high viscosity, and the thickness of the sealing member that was obtained was increased. Thus, the insertion into the connector housing was hindered.

EXAMPLES

The following compounds were used as oligomers, monomers, anti-rust agents, and a photopolymerization initiator when an anti-corrosive material in each of the examples and comparative examples was produced.

Oligomer: EBECRYL 8402 produced by DAICEL-ALLNEX LTD., average molecular weight Mw: 1,000
Monofunctional monomer: IBOA produced by DAICEL-ALLNEX LTD.
Bifunctional monomer: TPGDA produced by DAICEL-ALLNEX LTD.
Anti-rust agent 1: B0094 (BTA(1,2,3-benzotriazole)) produced by Tokyo Chemical Industry Co., Ltd.
Anti-rust agent 2: STARFINE (registered trademark), zinc cyanurate produced by Nissan Chemical Corporation
Photopolymerization initiator. IRGACURE (registered trademark) 369 produced by BASF SE (Preparation of Anti-Corrosive Material)

The oligomer, the monofunctional monomer, the bifunctional monomer, the anti-rust agent, and the photopolymerization initiators were mixed in at ratios shown in Tables 3 and 4. In this manner, the anti-corrosive materials in Examples 1 to 11 and Comparative Examples 1 to 3 were prepared.

TABLE 4

|  |  | Comparative Example 1 | Comparative Example 2 | Comparative Example 3 |
|---|---|---|---|---|
| Oligomer (parts by mass) | EBECRYL 8402 | 50 | 50 | 50 |
| Monofunctional monomer (parts by mass) | IBOA | 45 | 45 | 45 |
| Bifunctional monomer (parts by mass) | TPGDA | 5 | 5 | 5 |
| Anti-rust agent (parts by mass) | BTA | 5 | — | — |
|  | STARFINE | — | — | 1 |
| Photopolymerization initiator (parts by mass) | Omnirad 184 | 2 | 2 | 2 |
| Peeling adhesive force(N/mm) |  | 2.3 | 2.7 | 1.39 |
| Anti-corrosive performance |  | Satisfactory | Poor | Poor |

(Peeling Adhesive Force)

The anti-corrosive material thus prepared was applied to a Sn-plated copper plate, and was cured. In this manner, a test sample was prepared. The test sample was subjected to T-type peeling under a condition being a tensile speed of 100 nm/min through use of a tensile testing machine according to JIS K6854-3 (1999), and thus a peeling adhesive force was measured. A case where the peeling adhesive force was 2.5 N/mm or greater was evaluated as "pass". Otherwise, an evaluation as "failure" was given.

TABLE 3

|  |  | Example 1 | Example 2 | Example 3 | Example 4 | Example 5 | Example 6 |
|---|---|---|---|---|---|---|---|
| Oligomer (parts by mass) | EBECRYL 8402 | 50 | 50 | 50 | 50 | 50 | 5.0 |
| Monofunctional monomer (parts by mass) | IBOA | 45 | 45 | 45 | 45 | 45 | 45 |
| Bifunctional monomer (parts by mass) | TPGDA | 5 | 5 | 5 | 5 | 5 | 5 |
| Anti-rust agent (parts by mass) | BTA | 0.3 | 0.5 | 1 | 2 | 2.5 | 3 |
|  | STARFINE | — | — | — | — | — | — |
| Photopolymerization initiator (parts by mass) | Omnirad 184 | 2 | 2 | 2 | 2 | 2 | 2 |
| Peeling adhesive force(N/mm) |  | 2.9 | 2.7 | 2.8 | 2.8 | 3 | 2.7 |
| Anti-corrosive performance |  | Satisfactory | Satisfactory | Satisfactory | Satisfactory | Satisfactory | Satisfactory |

|  |  | Example 7 | Example 3 | Example 9 | Example 10 | Example 11 |
|---|---|---|---|---|---|---|
| Oligomer (parts by mass) | EBECRYL 8402 | 50 | 50 | 50 | 50 | 50 |
| Monofunctional monomer (parts by mass) | IBOA | 45 | 45 | 45 | 45 | 45 |
| Bifunctional monomer (parts by mass) | TPGDA | 5 | 5 | 5 | 5 | 5 |
| Anti-rust agent (parts by mass) | BTA | — | — | — | — | — |
|  | STARFINE | 0.05 | 0.1 | 0.2 | 0.3 | 0.5 |
| Photopolymerization initiator (parts by mass) | Omnirad 184 | 2 | 2 | 2 | 2 | 2 |
| Peeling adhesive force(N/mm) |  | 2.39 | 2.54 | 1.83 | 1.58 | 1.49 |
| Anti-corrosive performance |  | Satisfactory | Satisfactory | Satisfactory | Satisfactory | Satisfactory |

(Evaluation on Anti-Corrosive Performance)

Anti-corrosive performance was evaluated in the same manner as in the reference examples described above.

From Tables 3 and 4, it can be understood that, in each of Examples 1 to 11, the peeling adhesive force was large, and anti-corrosive performance was excellent. In contrast, in Comparative Example 1 in which the anti-rust agent (1,2,3-benzotriazole) was excessively contained, anti-corrosive performance was satisfactory, but peeling adhesiveness was poor. Further, in Comparative Example 2 in which the anti-rust agent was not used, the peeling adhesive force was satisfactory, but anti-corrosive performance was poor. Moreover, in Comparative Example 3 in which the anti-rust agent (zinc cyanurate) was excessively contained, both the peeling adhesive force and anti-corrosive performance were poor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An anti-corrosive material, comprising:
   an ultraviolet curable resin comprising, as a main component, a polymerizable compound including at least one of a photopolymerizable (meth)acrylate monomer or a photopolymerizable (meth)acrylate oligomer; and
   an anti-rust agent, wherein
   the polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups,
   the anti-rust agent comprises zinc cyanurate,
   0.05 to 0.3 parts by mass of the anti-rust agent are contained for 100 parts by mass of the ultraviolet curable resin, and
   the anti-corrosive material has a viscosity of 18,900 mPa's or less, the viscosity being measured at 25° C. according to JIS Z8803,
   wherein the ultraviolet curable resin comprises:
   the photopolymerizable (meth)acrylate oligomer at 50 parts by mass of the ultraviolet curable resin,
   the monofunctional (meth)acrylate monomer at 45 parts by mass of the ultraviolet curable resin,
   the bifunctional (meth)acrylate monomer at 5 parts by mass of the ultraviolet curable resin,
   the zinc cyanurate at 0.05 to 0.1 parts by mass of the ultraviolet curable resin, and
   a photopolymerization initiator at 2 parts by mass of the ultraviolet curable resin.

2. A wire with a terminal, comprising:
   a wire including a conductor and a wire covering member configured to cover the conductor;
   a metal terminal connected to the conductor of the wire; and
   a sealing member configured to cover a joint between the conductor and the metal terminal, the sealing member being formed by curing the anti-corrosive material according to claim 1.

3. The wire with a terminal according to claim 2, wherein the conductor includes an elemental wire formed of aluminum or an aluminum alloy, and the metal terminal contains copper or a copper alloy.

4. A wire harness comprising:
   the wire with a terminal according to claim 2.

* * * * *